United States Patent [19]

Bieberdorf et al.

[11] Patent Number: 5,703,484

[45] Date of Patent: Dec. 30, 1997

[54] ROLL INDEPENDENT VARIABLE INDUCTANCE INCLINOMETER

[75] Inventors: John W. Bieberdorf, Perry; John C. Wisehart, Stillwater; Greg W. Draper, Perry, all of Okla.

[73] Assignee: The Charles Machine Works, Inc., Perry, Okla.

[21] Appl. No.: 131,141

[22] Filed: Oct. 4, 1993

[51] Int. Cl.$^6$ .............................. G01B 7/14; G01P 15/00; G01C 9/06

[52] U.S. Cl. ................. 324/207.22; 324/226; 33/366

[58] Field of Search ................. 324/207.22, 226, 324/262; 73/516 LM; 33/366

[56] References Cited

U.S. PATENT DOCUMENTS

| | | | |
|---|---|---|---|
| 3,184,861 | 5/1965 | Conrad | 33/206 |
| 3,839,904 | 10/1974 | Stripling et al. | 73/71.2 |
| 3,984,918 | 10/1976 | Chaney | 33/366 |
| 4,531,300 | 7/1985 | Hiedel et al. | 33/366 |
| 4,779,353 | 10/1988 | Lopes et al. | 33/366 |
| 4,866,378 | 9/1989 | Redlich | 324/207.19 |
| 4,967,154 | 10/1990 | Marantette | 324/207.19 |
| 5,552,703 | 9/1996 | Hore | 324/207.22 |

FOREIGN PATENT DOCUMENTS

| | | | |
|---|---|---|---|
| 0590830 | 4/1994 | European Pat. Off. | |
| 1744466 | 6/1992 | U.S.S.R. | 33/366 |

OTHER PUBLICATIONS

German reference by Tränkler (no translation) Messtechnik vol. 82 No. 1 Jan. 1974 pp. 13–18.

*Primary Examiner*—Walter E. Snow
*Attorney, Agent, or Firm*—Sidley & Austin

[57] ABSTRACT

The pitch sensor of the invention includes a sealed container filled about half full with a magnetic liquid. A pair of coils are wound around the container and produce inductances corresponding to the amount of magnetic liquid disposed within the opening of the coils. As the angle of inclination of the pitch sensor changes, the volume of magnetic liquid becomes greater in one coil, as compared to the other coil, thereby providing a differential inductance. A pulsing circuit pulses the inductances and produces an analog voltage corresponding to the absolute angle of pitch, and a polarity voltage corresponding to the angle quadrant.

14 Claims, 2 Drawing Sheets

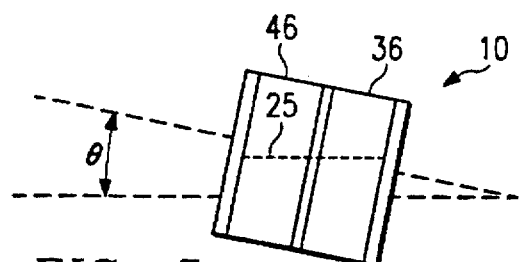
FIG. 5
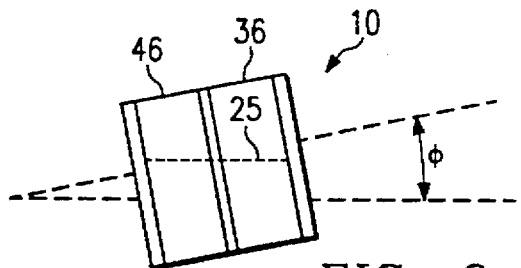
FIG. 6
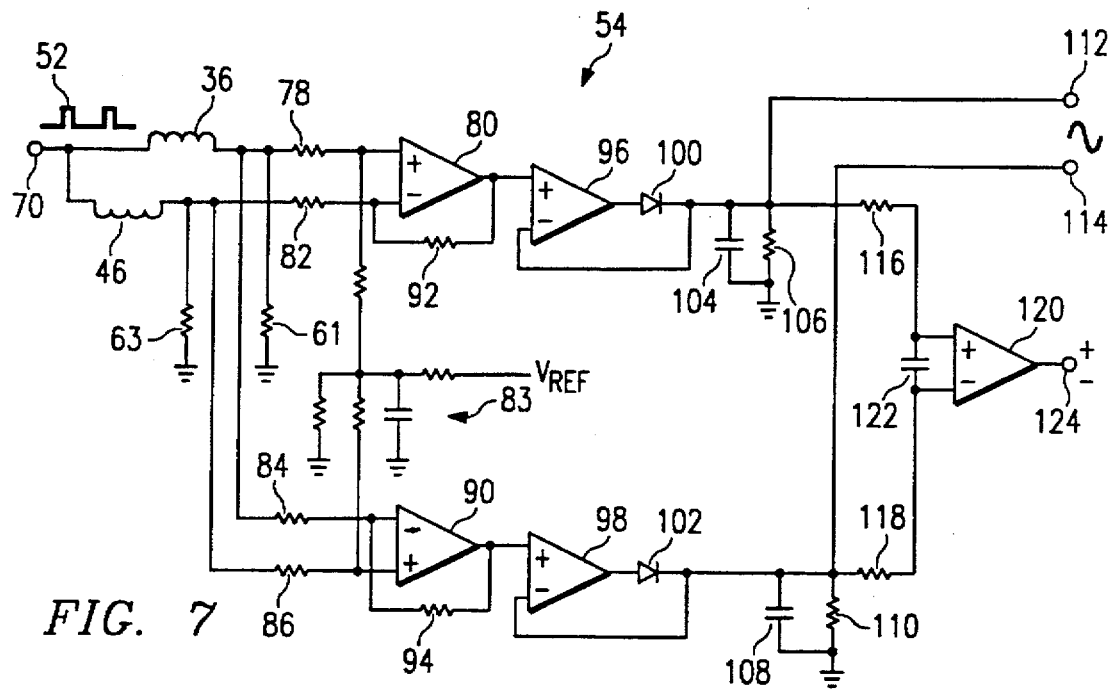
FIG. 7
| DIFFERENTIAL VOLTAGE | POLAR ANGLE |
|---|---|
| 10.0 | 90° |
| 9.9 | 89° |
| ⋮ | ⋮ |
| 0.10 | 1° |
| 0.00 | 0° |
| 0.00 | 0° |
| −0.10 | −1° |
| ⋮ | ⋮ |
| −9.9 | −89° |
| −10.0 | −90° |
POSITIVE POLARITY ($\phi$) — upper section
NEGATIVE POLARITY ($\theta$) — lower section
FIG. 8

5,703,484

ROLL INDEPENDENT VARIABLE INDUCTANCE INCLINOMETER

TECHNICAL FIELD OF THE INVENTION

The present invention relates to pitch or incline sensors, and more particularly to such type of sensor that is fixed to a rotating member and produces output indications of pitch angle that are independent of the roll position of the sensor.

BACKGROUND OF THE INVENTION

The determination of an angle of pitch or incline is an important parameter in the operation of many types of equipment. In other words, the pitch angle of equipment, and especially equipment that is capable of movement in one or more degrees of freedom, may be an important parameter in assessing the operation thereof or in changing the operation based upon the measured pitch angle. The determination of the pitch angle of underground boring equipment is an especially important parameter to maintain the appropriate orientation of the boring tool and to correct its direction of movement should the boring tool deviate from a desired direction of movement.

U.S. Pat. Nos. 5,133,417 and 5,174,033 by Rider each disclose a boring tool that is mechanically operated to form an underground borehole. These patents also describe a sensor attached to the boring tool for measuring the pitch angle of the boring tool and for transmitting indications of the pitch angle to surface-located receivers. In this manner, the path taken by the underground boring tool can be monitored and changed so that an underground burrow or bore can be formed between an origin and a desired destination. The angle sensors of the type described in the noted patents comprises a multi-segmented capacitor and a fluid-filled chamber that is effective to change the capacitance of the various capacitors in correspondence with a change in the angular orientation of the boring tool. By measuring the capacitance of the various capacitors, the angular orientation of the boring tool can be determined. While the steerable boring tool described in these patents relates generally to the determination of roll angle using multiple capacitive elements, such patents also describe the use of a pitch angle sensor to determine the pitch of the drill blade with respect to a horizontal reference. The disclosures of these two patents are incorporated herein by reference.

In U.S. Pat. No. 4,787,463 by Geller, et al., there is disclosed an underground boring tool having an incline sensor and circuits for modulating a transmitted electromagnetic field for providing indications of the pitch of the tool. The pitch sensor of this patent constitutes an enclosed chamber half filled with a conductive liquid, and resistive pads at the ends of the cylindrical enclosure. The resistance between the end electrodes and a common internal electrode provides an indication of the inclination of the boring tool.

In U.S. Pat. No. 4,672,753 by Kent, et al., there is disclosed a rotational sensor having a torous-shaped cavity with a resistive strip therein, and filled with a dielectric or resistive fluid. The rotational sensor functions as a potentiometer to determine the angle of rotation.

U.S. Pat. No. 3,786,472 by Scopacasa discloses a device for measuring angles of inclination. The sensor of this patent includes a torous-shaped container filled with a conductive liquid, and numerous electrical contacts placed therearound that are short-circuited by the conductive fluid, depending upon the angle of inclination.

U.S. Pat. No. 4,667,414 by Russell discloses a sensor having a spherical chamber with a spherical float and a permanent magnet embedded therein. The position indication is stated to be independent of the roll and pitch of the platform to which the sensor is mounted.

In view of the foregoing, it can be seen that a need exists for a cost-effective, more efficient pitch sensor that can be easily integrated into machines or equipment, and is of the type that provides a pitch indication independent of the roll angle orientation thereof. A further need exists for an inductive pitch sensor that does not need to be driven by an AC signal to provide output indications of pitch.

SUMMARY OF THE INVENTION

According to the principles and concepts of the present invention, there is disclosed a pitch sensor that is of a noncomplicated design and that provides output indications of pitch that are independent of angular or rotational orientations thereof.

In accordance with the preferred embodiment of the invention, a cylindrical-shaped container is half filled with a magnetic liquid. A coil is wound around each end of the container, whereby the magnetic fluid functions as a core and changes the inductance of the coils as a function of the inclination or pitch of the sensor. With a given pitch orientation of the sensor, the inductance of each of the coils does not change as a function of roll angle, and thus is independent thereof. The coils are pulsed and the outputs thereof sensed by respective differential amplifiers. Respective rectifier circuits produce analog outputs corresponding to the extent of the incline, while a comparator provides a digital output indicating a positive or negative angle of inclination. Microprocessor or other monitor circuits can provide digital or analog pitch information that can be transmitted to surface-mounted equipment for indicting the exact inclination of the underground boring tool. The pitch sensor of the preferred embodiment of the invention is underscored by its simplicity of design, reliability and accuracy.

BRIEF DESCRIPTION OF THE DRAWINGS

Further features and advantages will become more apparent from the following and more particular description of the preferred and other embodiments of the invention, as illustrated in the accompanying drawings in which like reference characters generally refer to the same elements or parts throughout the views, and in which:

FIGS. 5 and 6 illustrate different pitch angles of the pitch sensor of the invention;

FIG. 7 is a detailed electrical diagram of a circuit for processing electrical responses generated by the pitch sensor of the invention; and FIG. 8 is a depiction of a look-up table for converting electrical signals to corresponding polar angles.

DETAILED DESCRIPTION OF THE INVENTION

Figure 1:
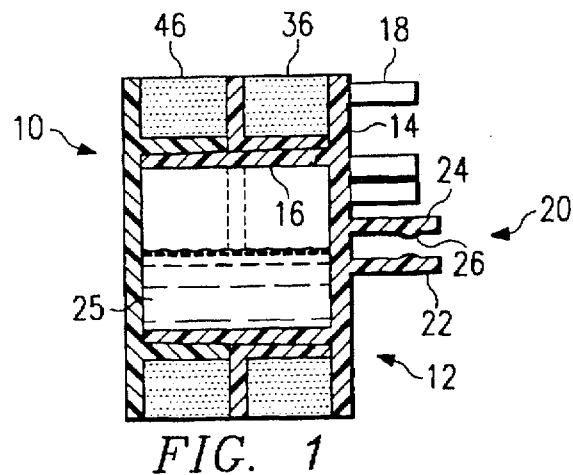
FIG. 1 is a side sectional view of a pitch sensor according to the preferred embodiment of the invention.

FIG. 1 illustrates the structural features of the pitch sensor according to the preferred embodiment of the invention.

While the pitch sensor of the invention is well adapted for use with rotating equipment, the invention can also be utilized with equal advantage in connection with other devices that do not undergo a full 360° range of angular movement.

Figure 2:
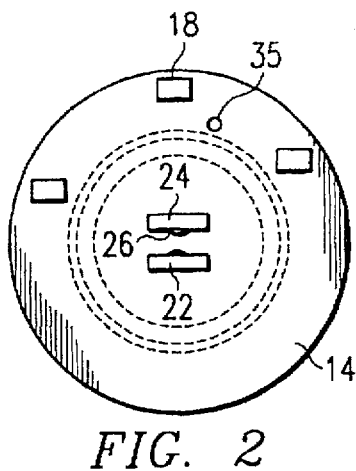
FIG. 2 is an end view of the pitch sensor of FIG. 1.
Figure 3:
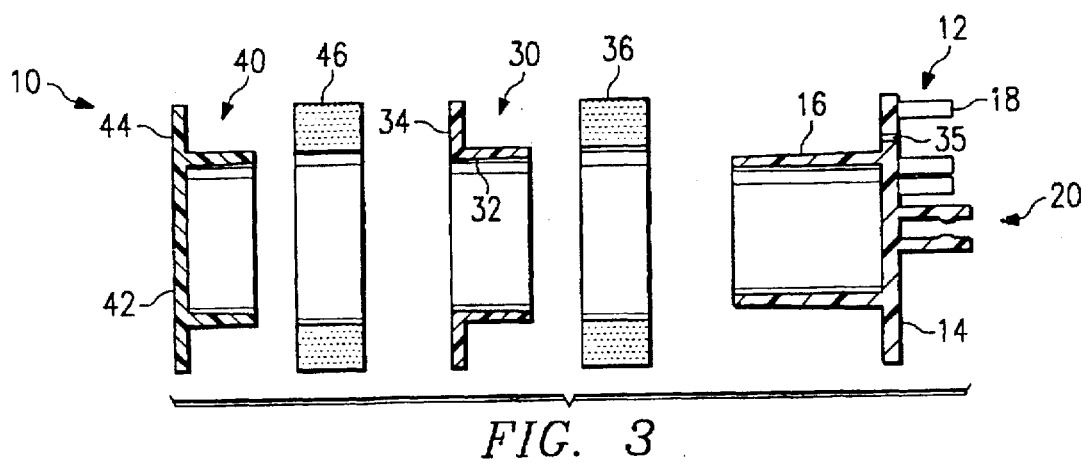
FIG. 3 is an exploded side sectional view of the pitch sensor of FIG. 1.

With specific reference now to FIGS. 1–3, the structural aspects of the invention will be described. The pitch sensor 10 of the preferred embodiment includes a closed container that is injection molded from an ABS type of plastic. The container includes three parts defined by a housing 12 having an end cap 14 formed integral with a cylinder 16 open at one end thereof. The end cap 14 of the housing 12 has three connection tabs for electrical connections, one identified as reference character 18. The end cap 14 also has molded integral therewith a snap-lock mounting arrangement 20 with tabs 22 and 24 and opposed concave extensions 26 formed on inside surfaces thereof. With this arrangement, the pitch sensor 10 can be snap mounted on an edge of a printed circuit board having a hole therein. The convex extensions on the respective tabs 22 and 24 provide a snap-lock attachment with the hole in the printed circuit board (not shown), thereby fixing the parts together. The end cap 14 of the housing 12 functions to contain a coil or winding, as will be described below. The fully assembled sensor 10 shown in FIG. 1 has contained therein a magnetic liquid 25.

A coil divider 30 (FIG. 3) is also formed of a nonconductive, plastic material, and has a cylinder portion 32 and an annular wall 34. The cylinder portion 32 of the coil divider 30 has an internal diameter sufficient for slipping over the cylinder 16 of the housing 12. The coil divider sidewall 34 operates in conjunction with the housing sidewall 14 to provide an annular channel for holding a coil, shown as reference character 36. A hole 35 in the sidewall 14 of the housing 12 allows the coil wires to be routed therethrough and anchored to the terminals 18.

An end cap 40 of the sensor 10 is formed essentially in the same shape and configuration as the coil divider 30, except the cap 40 has a closed end 42. A sidewall 44 of the cap 40 that is formed as an extension of the closed end 42 functions with the sidewall 34 of the coil divider 30 to define an annular channel for holding a second coil 46.

The assembly operation of the pitch sensor 10 is carried out as follows. The coil divider 30 is slipped on the cylinder 16 and glued or otherwise adhered to the housing 12, as shown in FIG. 1.

Next, the partially assembled housing is oriented with its open end to the top, and the cylinder 16 is filled about half full with a magnetic liquid. The magnetic liquid comprising an oil-based liquid with ferrite particles suspended therein is suitable for use in the present invention. A "ferrofluid" of suitable type is identified as EMG 905 type, obtainable from Ferrofluidics Corp. of Nashua, N.H. Such a type of magnetic liquid is effective to change the inductance of the first and second coils 36 and 46, depending upon the volume of liquid disposed within the openings of such coils.

The end cap 40 is then inserted onto the remainder of cylinder 16 of the housing 12 and fixed by a glue, or the like. The end cap 40 functions to close the container and prevent escape of the magnetic liquid, as well as fix the second coil 46 with respect to the first coil 36. In the preferred embodiment of the invention, the axial length and the diameter of the closed chamber containing the magnetic liquid is about 0.375 inch. In completing the assembly of the pitch sensor 10, the first and second coils 36 and 46 are wound within the respective annular channels, with the ends of the wires threaded through the hole 35 in the end cap 14. The coils are each wound of about 600 turns of a #34 magnet wire. Overall, it can be appreciated that the pitch sensor 10 of the invention is very small and does not require substantial space. Further, the pitch sensor 10 is of very simplified design with few parts, thereby enhancing the reliability and reducing the assembly and construction costs.

Figure 4:
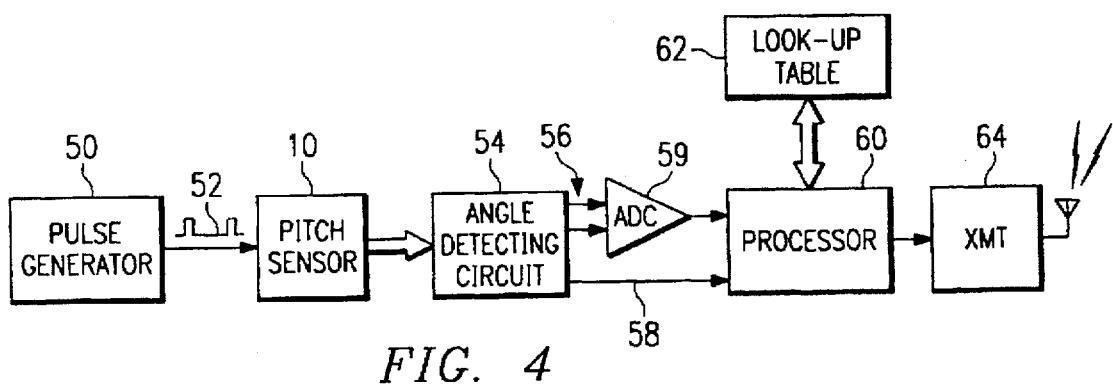
FIG. 4 is a block diagram of the electrical circuits for generating pitch angles and for transmitting the same to surface-mounted monitor equipment.

FIG. 4 illustrates in block diagram form the circuits according to the invention for generating indications of pitch angles in a underground boring tool, and for transmitting such indications to the surface. As noted above, the pitch sensor 10 has two coils that are driven by electrical circuits for providing signals indicating the pitch angle. A pulse generator 50 is shown producing output pulses coupled to the respective coils 36 and 46 of the pitch sensor 10. In the preferred embodiment, the pulses 52 have a duty cycle of 29,430 Hz, and a pulse width of 5 microseconds. The pitch sensor 10 produces a first coil output and a second coil output to a angle detecting circuit 54. The output signal from each pitch sensor coil 36 and 46 is different, depending upon the angle by which the pitch sensor 10 is oriented. With brief reference to FIG. 5, the pitch angle sensor 10 is shown disposed at a specified angle θ with respect to the horizontal. In this orientation, the volume of the magnetic liquid 25 is greater within the coil 36 as compared to the volume of the magnetic liquid within coil 46. Because the magnetic liquid 25 functions as a core, the coil 36 responds to the pulses 52 in a manner different from that of coil 46, because of the greater inductance of coil 36. As the angle of inclination becomes greater, the coil 36 produces a response based on an increased inductance thereof, and coil 46 produces a response based on less inductance. As can be appreciated, the angle of the pitch sensor 10 is thus sensitive to pitch because of the changing inductances provided by the changing volume of the magnetic liquid 25 disposed within each coil 36 and 46. It should also be noted that when the angle sensor 10 is oriented as shown in FIG. 6, and where the pitch angle θ=φ, the electrical responses from the coils 36 and 46 will be substantially opposite from that described above in connection with FIG. 5. The only difference between the outputs of the pitch sensor 10 in FIGS. 5 and 6 is that they are reversed. In terms of magnitude, the outputs of the pitch sensor orientations as shown in FIGS. 5 and 6 are of the same magnitude, but of opposite polarity.

With reference back to FIG. 4, the angle detecting circuit 54 is shown providing an analog output 56 and a digital output 58. The analog output 56 corresponds to the magnitude of the pitch angle of the sensor 10, and the digital output 58 corresponds to the polarity of the pitch angle. In terms of polarity, the pitch of the angle sensor shown in FIG. 5 is of one polarity and the pitch angle of the sensor shown in FIG. 6 is of the opposite polarity. An analog-to-digital converter 59 converts the analog indication of the pitch magnitude to a corresponding digital signal which is coupled to a processor 60. In like manner, the digital signal 58 corresponding to the polarity of the pitch angle is coupled to the processor 60 to provide the data sufficient for producing signals indicative of the absolute pitch angle of the sensor 10. The processor 60 has sufficient memory for storing a look-up table 62 for correlating the pitch angle polarity and magnitude data into corresponding polar angular information. In other words, magnitude and polarity data is coupled to the processor 60 for conversion via the look-up table 62 to angular information varying within a 0°–180° window. For example, for a positive polarity, an amplitude may represent angles between 0° and +90°. On the other hand, for a negative polarity, the same magnitudes correspond to angles between 0° and −90°. For equipment that cannot undergo such a wide variation of angular orientations of the sensor, the look-up table can be tailored accordingly.

It should also be realized from FIG. 4, that all the equipment shown is fixed to the underground boring equipment and rotates therewith, and there are no independent moving parts except for the magnetic liquid 25 sealed within the chamber of the pitch sensor 10. It should be noted that the processor can be programmed to process the pitch angle and polarity information to filter, average, etc., the data and provide output information to the transmitter. For example, when the sensor 10 is subject to vibration and other motion other than rotation motion, the processor 60 can process the pitch information by accumulating a number of samples of pitch data and average the data to produce a filtered output to the transmitter 64. Many other digital processing techniques are well known for further processing digital data to achieve specific results.

A transmitter 64 is coupled to the processor 60 for encoding pitch angle information on a carrier or other type of signal for transmitting the same to a distant receiver. Depending upon the particular type of system involved, the receiver can decode the pitch angle information and automatically control the underground boring tool to correct or maintain a given pitch angle. On the other hand, a manually-operated receiver at the surface of the ground can receive the indication of pitch angle and present a visual display to the user. In this situation, the user can communicate or otherwise control the equipment that drives the underground boring tool to correct or maintain a given pitch angle. The processor 60 can be programmed to maintain a continuous monitor of the pitch angle and provide corresponding modulation by the transmitter of a carrier signal. The processor 60 can also be programmed to monitor the pitch angle of the underground boring tool but only provide transmitted signals should the pitch angle change by a specified amount.

FIG. 7 illustrates the detailed circuits of the angle detecting circuit 54. The pulses 52 of the pulse generator 50 are coupled to the input 70 of the angle detecting circuit 54. The pulses 52 are coupled to the pitch angle coils 36 and 46 which have one kilohm shunt resistors 61 and 63 connected to the circuit common. The other terminal of the coil 36 is coupled through a large resistance 78 to the noninverting input of a differential amplifier 80. The other terminal of coil 46 is similarly connected through a large resistance 82 to the inverting input of the differential amplifier 80. In like manner, the coils 36 and 46 are connected respectively through large resistances 84 and 86 to the opposite inputs of another differential amplifier 90. Respective feedback resistors 92 and 94 coupled between the output of the amplifiers 80 and 90 to the inverting inputs thereof provide the requisite gain for the signals. An amplifier bias circuit 83 provides a bias voltage to the noninverting inputs of the differential amplifiers 80 and 90. The bias circuit 83 produces the same threshold voltage of about 0.2 volts to the respective amplifiers for comparison with the responses of the pulses 52 coupled through the inductances of the coils 36 and 46. Coupled to each output of the differential amplifiers 80 and 90 are respective amplifiers 96 and 98 and corresponding diodes 100 and 102. The amplifier 96 and the diode 100 configured in the manner shown in FIG. 7 function as a rectifier to remove the negative part of the signals generated by the differential amplifier 80. An RC circuit comprised of capacitor 104 and resistor 106 serve to filter the rectified signals produced by the amplifier 96 and diode 100. In like manner, a capacitor 108 and resistor 110 filter the rectified signals produced by the amplifier 98 and diode 102 to produce a filtered signal. The signals generated at outputs 112 and 114 provide a differential, analog output that is representative of the extent of incline of the pitch sensor 10. Further, the analog signals produced at outputs 112 and 114 are coupled through respective resistors 116 and 118 to the respective noninverting and inverting inputs of a comparator 120. A capacitor 122 serves to filter the differential signal applied to the inputs of the comparator 120. The output of the comparator 120 is connected to an output 124 that provides a polarity indication of the measured pitch. In other words, if the inductance of the coil 36 is greater than the inductance of coil 46, as determined by the amount of magnetic liquid disposed within the windings, then the output of the comparator will be at one logic level. When the inductance of coil 46 is greater than that of coil 36, then the output of the comparator 120 will be an opposite logic level, indicating an opposite polarity. As noted above in connection with FIG. 4, the analog outputs 112 and 114 of the angle detecting circuit 54 are coupled to an analog-to-digital converter for conversion into a corresponding digital signal. The converted digital signal and the digital polarity output of the angle detecting circuit 54 are coupled to the processor 60 for further conversion into a polar angle.

The operation of the circuit of FIG. 7 is more readily understood by the following description. Assuming, for purposes of example, that the pitch sensor 10 is inclined in the manner shown in FIG. 5, then the extent of the magnetic liquid 25 within coil 36 is greater in volume than that disposed within coil 46. As a result, the inductance of coil 36 is greater than that of coil 46. When the pitch sensor 10 of the invention is utilized in underground boring tool, the orientation of the sensor shown in FIG. 5 is indicative of a pitch of the boring tool that is not level, but rather which is boring deeper into the ground. With reference to the detecting circuit 54 of FIG. 7, and considering the downward pitch of the sensor 10 illustrated in FIG. 5, it is noted that the inductance of the coil 36 is greater than that of the coil 46. The LR circuit formed by coil 36 and resistor 61 produces a first response at the noninverting input of amplifier 80. In like manner, the LR circuit formed by coil 46 and resistor 63 provide a second response at the inverting input of amplifier 80. The first and second LR responses are also coupled to the opposite inputs of the amplifier 90. It should be noted that the coil 36 having the larger inductance, produces a smaller voltage at the noninverting input of amplifier 80, as compared to the voltage produced by the smaller inductance of coil 46. As a result, the output of amplifier 80 is negative during the periods of the pulses 52, while the output of amplifier 90 is positive during such periods. In response to the negative output of amplifier 80, the output of amplifier 96 will also be negative, thereby reverse biasing the diode 100. Very little voltage is thus produces across the filter capacitor 104 and resistor 106.

With respect to differential amplifier 90, the output thereof is positive when the sensor 10 is inclined as shown in FIG. 5, thereby forward biasing the diode 102 and producing a positive voltage across the filter capacitor 108 and resistor 110. In response to these analog outputs of the rectifier and filter circuits, the output comparator 120 is driven with a more positive voltage on its inverting input, thereby driving the output 124 to a negative voltage. The negative voltage at polarity output 124 defines a negative slope, such as the pitch of the sensor 10 shown in FIG. 5. The differential analog signal between the outputs 112 and 114 define the particular pitch angle θ. For varying pitch angles of the sensor 10 shown in FIG. 5 between 0 and about 90°, the output of the comparator 120 remains negative, while the differential outputs between terminals 112 and 114 vary in accordance with the extent of the pitch.

Once the sensor 10 becomes oriented with a pitch such as shown in FIG. 6, the output of the comparator 120 produces a positive output voltage, indicating a polar angle between 0 and 90° Again, the differential voltage between terminals 112 and 114 define the specific angle of pitch.

FIG. 8 illustrates a look-up table 62 that can be utilized for converting the differential voltage between the analog outputs 112 and 114, and the polarity output 124 of the angle detecting circuit 54, to a corresponding polar angle. For example, if the range of differential voltages between the analog outputs 112 and 114 is between +10.0 volts and –10.0 volts, then the polarity output 124 can be utilized to index the table 62 and find the appropriate polar angle. As described above in connection with FIG. 4, the polar angle can be processed by the processor 60 and encoded into a carrier frequency and transmitted to the surface equipment.

In view of the foregoing, a pitch angle sensor and corresponding circuits have been disclosed, and which provide a low cost and uncomplicated device for providing accurate angles of pitch. Various modifications may suggest themselves to those skilled in the art without departing from the spirit and scope of the invention. The invention is thus not to be restricted to the specific forms shown, except as to the extent defined by the claims.

What is claimed is:

1. A pitch angle sensor and circuit, comprising in combination:

a container having an axial axis defining an axis of rotation of the sensor, and where an angle of the axial axis with respect to a reference defines a pitch angle of the sensor;

a magnetic liquid filling said container at a level less than full;

a pair of coils, each coil surrounding the container so that the magnetic fluid influences the inductance of each said coil as a function of pitch orientation of the container but the inductance of each coil is independent of the roll position of the sensor about the axis of rotation;

an excitation circuit for pulsing the coils with at least one pulse; and a detecting circuit receiving an electrical response from each said coil and for producing an electrical indication representative of the extent of pitch of the container and an electrical indication representative of a polarity of the pitch of the container.

2. The sensor of claim 1, further including a pair of differential amplifiers each for receiving the responses generated by the respective coils and means for rectifying output signals from the differential amplifiers.

3. The sensor of claim 2, further including a comparator for comparing signals produced by the pair of differential amplifiers.

4. A pitch angle sensor, comprising:

a cylindrical-shaped container having an axial axis and having closed ends;

a magnetic liquid contained in said container and filling said container to a volume less than full;

no more than a pair of coil windings and no other windings wound around the container so that the magnetic liquid of the container can be disposed within each said coil winding and function as a core and thereby influence the inductance of each said coil winding when the container changes an angular orientation between a reference and said axial axis, but does not change the inductance of the coil windings when the container rotates about the axial axis, thereby providing a compact pitch angle sensor.

5. The pitch angle sensor of claim 4, further including a circuit for simultaneously pulsing each said coil with the same pulse to produce corresponding inductive responses, and a circuit for processing the inductive responses to produce a voltage that varies in magnitude in correspondence with the angle of pitch of the container.

6. The pitch angle sensor of claim 4, further including a printed wire board having electrical processing circuits, and said pitch angle sensor is removably attached to the printed wire board, and said printed wire board is rotatable with said pitch angle sensor.

7. A pitch angle sensor, comprising:

a plastic container including:

a housing portion having a cylindrical part and a first end wall closing an end of the cylindrical part and extending radially outwardly beyond the cylindrical part;

a divider portion having a cylinder part and an annular divider wall extending radially outwardly beyond the cylinder part, said cylinder part being insertable over the cylindrical part of the housing portion;

a cap portion having a cylinder portion and a second end wall closing an end of the cylinder portion and extending radially outwardly beyond the cylinder portion of the cap portion, said cylinder portion of the cap portion being insertable over the cylindrical part of the housing portion; and a pair of coil windings, the windings being disposed respectively between the divider wall of the divider portion and the respective first and second end walls.

8. The pitch angle sensor of claim 7, further including terminals formed on the first end wall of said housing for anchoring wires of said pair of coil windings thereto.

9. The pitch angle sensor of claim 7, further including in combination a printed wire board having an edge with an indention therein, and said container includes a pair of spaced apart tabs for receiving therein the primed wire board, and at least one said tab has a convex portion for engaging the indention of the printed wire board for snap-locking the sensor and the printed wire board together.

10. The pitch angle sensor of claim 1, wherein the detecting circuit has a first output providing an electrical representation of the extent of pitch of the container, and a second output different from said first output for providing an electrical signal representation of the polarity of the pitch of the container.

11. A pitch angle sensor and circuit, comprising in combination:

a container having an axial axis defining an axis of rotation of the sensor, said container including, a housing having a cylindrical portion and an end cap attached to said cylindrical portion;

a coil divider that can be slid over the cylindrical portion of the housing to provide a first annular channel with said end cap for holding a first coil; and a cap that can be slid over the cylindrical portion of the housing and define a second annular channel with respect to the coil divider for holding a second coil;

a magnetic liquid filling said container at a level less than full; and said first and second coils surrounding the container so that the magnetic fluid influences the inductance of each said coil as a function of pitch orientation of the container, but the inductance of each coil is independent of the roll position of the sensor about the axis of rotation.

12. A pitch angle sensor and circuit, comprising in combination:

a container having an axial axis defining an axis of rotation of the sensor;

a magnetic liquid filling said container at a level less than full;

a pair of coils, each said coil surrounding the container so that the magnetic fluid influences the inductance of each said coil as a function of pitch orientation of the container but the inductance of each coil is independent of the roll position of the sensor about the axis of rotation;

an excitation circuit for pulsing the coils with at least one pulse; and a detecting circuit receiving an electrical response from each said coil and having a first output for producing an electrical indication representative of the extent of pitch of the container, and a second output different from said first output for providing an electrical signal representation of the polarity of the pitch of the container.

13. The pitch angle sensor of claim 5, wherein said pair of coil windings each have a conductor connected to each other and pulsed so as to pulse said coil windings in parallel.

14. The sensor of claim 11, further including means attached to the housing for snap-locking the sensor to a circuit board.

\* \* \* \* \*